June 26, 1951  J. R. COSBY  2,558,342

CONDITION RESPONSIVE MEASURING APPARATUS

Filed Jan. 18, 1946  2 Sheets-Sheet 1

Inventor
JAMES R. COSBY

By George V. Ettgrott
Agent

June 26, 1951  J. R. COSBY  2,558,342
CONDITION RESPONSIVE MEASURING APPARATUS
Filed Jan. 18, 1946  2 Sheets-Sheet 2

Inventor
JAMES R. COSBY
By George V. Eltgroth
Agent

Patented June 26, 1951

2,558,342

UNITED STATES PATENT OFFICE 2,558,342

CONDITION RESPONSIVE MEASURING APPARATUS

James R. Cosby, Towson, Md., assignor to Bendix Aviation Corporation, South Bend, Ind., a corporation of Delaware Application January 18, 1946, Serial No. 641,914

5 Claims. (Cl. 177—380)

This invention relates to condition responsive indicators of the electrical variety and more particularly to such indicator of the type wherein current flowing through the sensing element introduces errors in indication.

There are presently in use, for the purpose of upper air investigation, air borne radio transmitters associated with pressure responsive, temperature responsive and humidity responsive elements which are sent aloft for the purpose of relaying to the ground information relative to meteorological conditions in the air strata through which they are passing. Contemporary devices of this nature incorporate a radio frequency oscillator coupled to a radio transmitting antenna and adapted to be modulated in accordance with the relaxation oscillation frequency of a second oscillator, whose relaxation rate is controlled by the condition at the moment under observation.

The use of hair driven variable resistance elements to secure humidity indications has been superseded by electrical units in which the conductivity of a film of a deliquescent substance, such as lithium chloride, situated between two electrodes, varies as a function of the ambient relative humidity. Compositions suitable for, and the structure of, such hygroscopic resistors are more fully described in Fiene 2,064,651, Dunmore 2,285,421 and Dunmore 2,295,570.

Although the speed of response to changes in humidity at various levels has been materially enhanced by the adoption of hygroscopic resistors as control elements in the relaxation oscillator circuit, yet they suffer from a serious deficiency in their susceptibility to polarization errors. This arises from the fact that the varying conductivity through such films in the presence of differing humidities is essentially an electrolytic phenomenon and as such, inevitably accompanied by changes in the body of the conducting composition and at the electrode-composition interfaces.

Also, when a resistor whose value changes with change in ambient temperature is used for the purpose of delivering temperature changes, the energy dissipated in the resistor causes its temperature to differ from the surrounding temperature level. Under static conditions, so long as the current through the resistor is constant, this may be compensated for by displacing the indicating scale an appropriate amount. If the current through the resistor be permitted to vary, however, there is no longer any possibility of compensating reliably for the difference in temperature level, as it changes in an unpredictable manner.

Accordingly, it is an object of the invention to minimize errors in indications of the magnitude of a given condition arising from variation of current flow through an electric sensing element.

It is another object of the invention to provide new and novel humidity indicating means responsive to directly induced changes in a hygroscopic resistor in which the effects of polarization errors are minimized.

A further object of the invention is to provide new and novel humidity indicating apparatus in which the current flowing through an electrolytic resistor may be readily standardized to a normal value.

Yet another object of the invention is to provide new and novel means for independently adjusting the shape of the leakage resistance-relaxation frequency characteristic and the absolute frequency of a pre-selected point on the characteristic curve of a relaxation oscillator.

The above objects and advantages are substantially accompanied in an arrangement wherein a characteristic curve-shaping resistor is connected in the relaxation frequency controlling circuit in series with a humidity responsive resistor, and means for varying the losses of the auxiliary frequency portions of the relaxation oscillation circuit are also provided.

Othe objects and advantages of the invention will in part be described and in part be obvious when the following specification is read in conjunction with the drawings in which:

Fig. 3 is a side view of the arrangement shown in Fig. 2.

Figure 1:
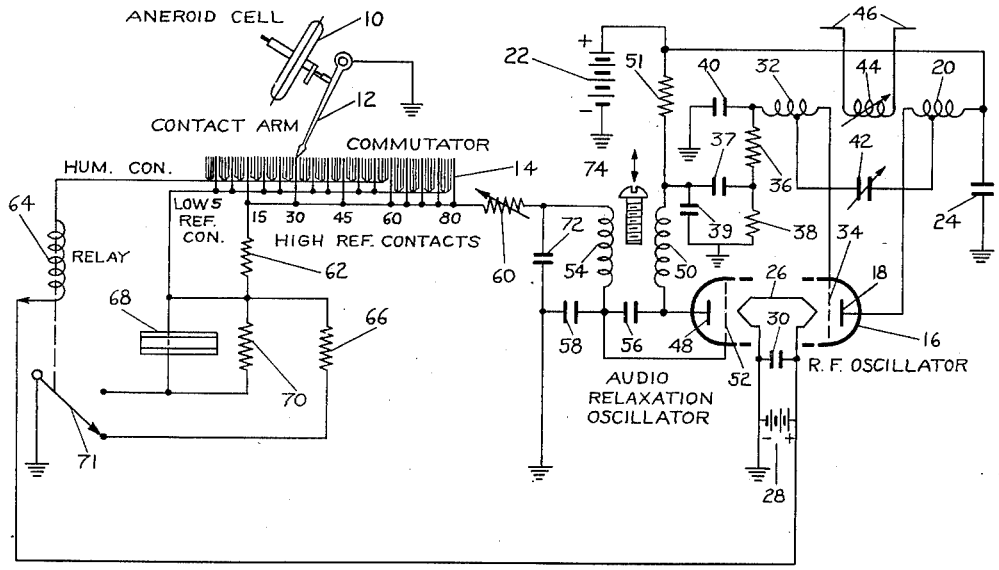
Figure 1 is a schematic diagram of radio transmitting sounding apparatus incorporating the improvements of the invention.

Referring now to Figure 1, there is shown an evacuated cell 10 driving a grounded contact arm 12 over a commutator assembly 14, whose segments are connected to various points in a resistance network connected in the grid circuit of a relaxation oscillator in a manner well known in the art.

The oscillations whose modulations transmit the indications of the air borne apparatus to a remote observer are generated in one section of a thermionic vacuum tube 16, which may be of the type commercially designated 3A5. The anode 18 of the radio frequency oscillator section of valve 16 is connected through the anode coupling coil 20 to the positive terminal of the anode source 22 having its negative terminal connected to ground. The source 22, here indicated as a battery, is shunted for high frequency currents by the capacitor 24 connected between its positive terminal and ground. The electron emission necessary for the operation of vacuum tube 16 is secured from the dual emissive filament 26 energized from the filament battery 28 and shunted for high frequency currents by capacitor 30. The negative terminal of the filament 26 is connected to ground completing the anode circuit to the source 22.

The radio frequency oscillator winding 20 is spaced from, and electromagnetically coupled to, a grid winding 32 having one terminal connected to the control grid 34 and the other terminal thereof grounded through the series connected resistors 36 and 38. The low potential side of grid coil 32 is grounded for radio frequency energy by capacitor 40 which may have a capacity of the order of 100 mmfd., since the radio frequency oscillations occur at the rate of 50 or more mcs. per second, as adjusted by trimmer capacitor 42 connected between intermediate taps on the anode coil 20 and grid coil 32. The radiated energy is derived from the coupling coil 44 located intermediately of anode coil 20 and grid coil 32, and having its two ends connected individually to the quarter wave elements of a half-wave dipole antenna 46. The division of the radio frequency oscillator grid leak into sections 36 and 38 is for a purpose which will later be more fully explained.

The translation of the varying resistances of the temperature and humidity responsive elements into modulation affecting the transmitting radio frequency oscillator is performed by the relaxation oscillator section of vacuum tube 16 whose anode 48 is connected to the positive terminal of source 22 through the anode coil 50 of the relaxation frequency oscillator auxiliary frequency coupling transformer and anode resistor 51.

Coincidentally with the relaxation oscillation, the current to anode 48 flows in short pulses, producing similar short voltage pulses across anode resistor 51 coupled to the control grid 34 through capacitor 37 connected between the anode end of resistor 51 and the junction point of grid leak resistors 36 and 38. The voltage pulses so impressed on grid 34 are negative in polarity and serve to momentarily interrupt the operation of the radio frequency oscillator. The capacitor 39 connected between the anode end of resistor 51 and ground provides a return for energy at the auxiliary frequency and for this purpose, a capacitor of 0.01 mfd. has been found satisfactory, while a suitable value for capacitor 37 has been found to be 0.05 mfd. The control grid 52 of the relaxation frequency oscillator section of the tube 16 is connected to one terminal of the grid coil 54 of the auxiliary frequency oscillation transformer of the relaxation frequency oscillator. The terminals of anode 48 and 52 are also bridged by capacitor 56 which may have a value of 500 mmfd. and grid terminal 52 is connected with ground through capacitor 58 which may, for example, have a value of 500 mmfd. A suitable auxiliary frequency for such a relaxation oscillator has been found to be approximately 2 mcs. per sec. with a relaxation rate of 2–190 cycles per sec.

The direct current circuit between grid 52 and ground is completed through the series combination of adjustable resistor 60, fixed resistor 62 and, depending upon the contact position of relay 64, thence through the temperature responsive resistor 66 or the hygroscopically responsive resistor 68 through movable contact 71 to ground. To permit continued operation of the relaxation oscillator when the resistor 68 assumes the extremely high values characteristic of low relative humidities at very low temperatures, resistor 68 is shunted by resistor 70.

Figure 2:
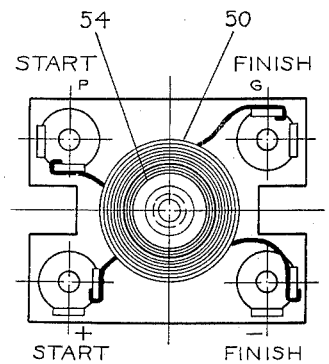
Figures 2 and 3 are drawings illustrating the detailed structure of the relaxation oscillator auxiliary frequency coils.
Figure 3:
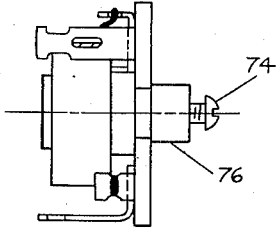

The resistance path to ground just described is shunted by a capacitor 72 having a nominal value of .09 mfd. The coils 50 and 54 may be concentrically wound, as best seen in Figures 2 and 3, and a conducting screw 74 may be located co-axially thereof movable into and out of the coil assembly as it is rotated in the mating threads of the support 76. The grid coil 54 is located in the inner portion of the concentric coil assembly while the anode coupling coil 50 is located exteriorly thereof.

Figure 4:
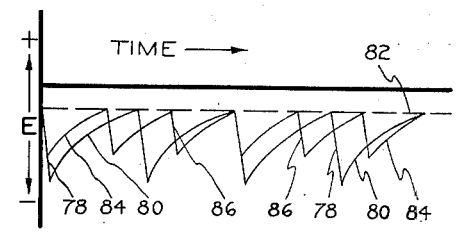
Figure 4 is a diagram illustrating the various relaxation oscillation wave forms secured.

As evident from the drawings, the input circuit and out-put circuit corresponding respectively to control grid 52 and anode 48 are connected in positive feed back relationship to generate oscillations in the auxiliary frequency oscillation transformer assembly 50, 54. The oscillations in coils 50 and 54 increase in magnitude to a point causing the flow of grid current between control grid 52 and filament 26 to develop a negative charge on the ungrounded electrode of capacitor 72. When this negative charge has reached a sufficient value the amplifying action of the relaxation oscillator section of tube 16 is determined, causing a cessation of oscillation and of the flow of charging current. Capacitor 72 now discharges through the associated resistance network until the bias present between the control grid 52 and filament 26 has assumed such a value that oscillatory conditions are re-established after which a similar cycle is repeated. The voltages appearing across capacitor 72 during this operation are related to time in substantially the manner shown in the plot of Figure 4, with the negative stroke 78 illustrating the increasing negative charge on the capacitor 72 during the period of oscillation build-up and the exponential portion 80 of the curve illustrating the decay of bias on control grid 52 occurring by virtue of the leakage of the charge from 72 through the grounding resistance network. The dashed line 82 in Figure 4 illustrates the bias voltage level at which oscillatory conditions are restored and, as seen from the illustrative curves, when the exponential curve 80 intercepts the oscillation pick-up voltage level 82 oscillations are again generated in the relaxation frequency section of tube 16 to produce the succeeding increase 78 in negative voltage. An anode current pulse flows through resistor 51 during each negative stroke of the relaxation oscillator voltage.

As the air borne assembly moves upwardly through the atmosphere the contact arm 12 sweeps successively across the bars of commutator 14, intermittently grounding and ungrounding one terminal of the operating winding 64 of the humidity temperature selecting relay. When the winding 64 is energized, contact 71 grounds one terminal of the humidity responsive resistor 68 thus completing the grid circuit of the relaxation oscillator through this unit. In the presence of low humidities the resistance of elements 68 is quite high, thereby lengthening the exponential decay period and decreasing the relaxation frequency, while in the presence of high humidities the converse is true. When the contact arm 12 is situated over the intervening non-conductive intervals of commutator 14, winding 64 is deenergized and the temperature sensitive resistor at 66 completes the discharge circuit. As is well known, at intervals a ground is completed either from the low voltage or high voltage ends of resistor 62 to provide high and low reference frequencies for calibration purposes.

As the invention is of especial value with respect to the humidity indicating portions of the circuits, in the remainder of this discussion attention will be directed primarily to the operating characteristic when the relay winding 64 is energized, which is to say, when the humidity sensitive resistor is inserted in the discharge circuit.

The shape of the curve made up of the successive negative voltage strokes 78 and exponential decay periods 80 in Figure 4 illustrating the voltage variations across the capacitor 72 at once indicate that the integral of this curve has a finite negative value. As the discharge circuit is purely resistive, the current therethrough has a wave form similar to the voltage depicted in Figure 4 and, hence, also has a unidirectional component conventionally designated as the grid current. As is known in the art, the level of the oscillation pick up voltage 82 is that value of control grid bias where the power gain within the relaxation oscillator section of the vacuum tube is equal to the losses in the auxiliary frequency oscillation transformer assembly. Variations in commercially available tubes cause corresponding variations in the level of the pick up voltage 82.

Now the maximum voltage to which capacitor 72 is charged is substantially equal to the maximum auxiliary frequency oscillation voltage obtained at control grid 52. This maximum oscillation voltage in turn is fixed at that level where the input power to the relaxation frequency oscillator is equal to the losses in the auxiliary frequency oscillation transformer assembly. Increasing the losses in this portion of the circuit decreases the oscillation voltage magnitude at which the equilibrium condition obtains. As the grid current drawn by the relaxation frequency section of the oscillator tubes affects these losses and as the grid current characteristic varies considerably from tube to tube in the commercial products, the peak negative excursion of the relaxation voltage is also subject to variation. As the two limits of the oscillation wave forms are movable independently of one another, it is clear that the integral of the wave form, i. e. the grid curent traversing the humidity responsive resistor 68, is also subject to variation.

The humidity responsive resistor 68 is conveniently a device comprising a deposit of a hygroscopic salt such as lithium chloride on a non-conducting base between two conducting electrodes. Conduction through this salt in the presence of high humidities is essentially of an electrolytic nature generating counterelectromotive forces at the electrode boundaries altering the apparent resistance of the resistor assembly. Being of an electrolytic nature, these electromotive forces are dependent upon the magnitude of grid current flow through the humidity responsive element, and changes continuously with time.

It has been attempted to avoid errors from this source by utilizing, for the humidity indications, only the oscillator frequency existing at a predetermined time after the initiation of the humidity measurement, but the presence of a second uncontrolled variable, the grid current, has made this method of minimizing errors unsuccessful. The addition of the movable screws 74 to the auxiliary frequency oscillation transformer assembly for the relaxation oscillator affords a means for standardizing the grid current flow in the relaxation oscillator grid circuit despite material variation in the characteristic of the circuit components and tubes.

It has been earlier mentioned that the peak negative voltage obtained in a relaxation oscillator cycle is determined by the maximum auxiliary frequency oscillation voltage developed and that this, in turn, is controlled by the voltage level at which equilibrium obtains between input energy and circuit losses. Now the insertion of a conductive object into the high frequency coil of the assemblyl 50, 54 reflects losses into that assembly by virtue of the eddy currents generated therein. Introduction of an increasing length of the screw 74 increases the losses and vice versa.

The effect of the addition of such losses is clearly portrayed in a second set of curves of Figure 4 showing that the condition of equilibrium bringing about cessation of the oscillations occurs at a lower level when such additional losses have been inserted as shown by the new exponential decay curve 84 of the grid bias starting from a lower peak value of negative voltage. Under these conditions the bias on control grid 52 returns more speedily to the pick-up voltage initiating a negative stroke 86 in less time than would have previously been the case. Hence, the oscillations continue at a more rapid rate and, due to the smaller peak negative voltage obtained during the relaxation oscillation cycle, the integral of this new relaxation wave form has a lesser negative value, indicating a diminution of grid current. If it is desired merely to diminish the grid current, the resultant increase in relaxation oscillation frequency may be eliminated by an increase in the value of capacitor 72 whose change also affords a means of controlling the relaxation frequency but which is substantially without effect upon the grid flow.

To standardize the shape of the characteristic curve of resistance vs frequency characteristic of the relaxation oscillator, the variable resistor 60 is adjusted at the completion of fabrication of such an atmospheric sounding device, and locked in position after the curve has been brought to the proper configuration. The variation in total discharge resistance hereby produced is accompanied by a change in relaxation frequency and in the relaxation oscillator grid current. After the desired ratio of frequency change for a specified ratio of discharge circuit resistances has been thus established, the screw 74 is then adjusted to bring the grid current flowing through the grid-leak circuit to the predetermined standard value, while different capacitors 72 are inserted to adjust the absolute frequency magnitude of any selected reference point on the resistance-frequency characteristic. It is to be here noted that the variation of curve configuration adjusting resistor 60 produces an increase in relaxation frequency with an increase in grid current flow, whereas the variation in losses associated with the auxiliary oscillation circuits of the relaxation frequency oscillation increases the relaxation frequency but decreases the grid current flow.

Figure 5:
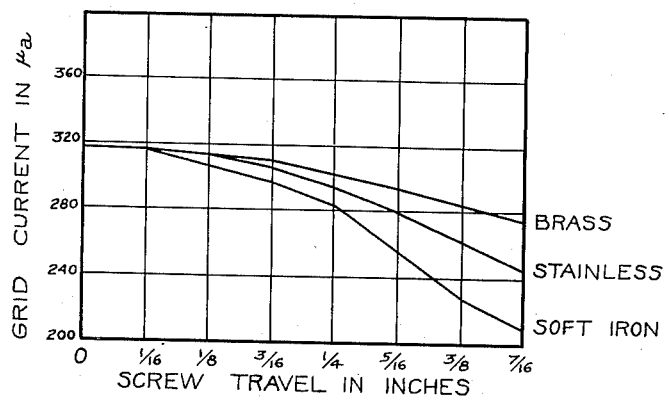
Figure 5 is a graphic illustration of the relationship between the adjustable screw position and magnitude of the relaxation oscillator grid current.
Figure 6:
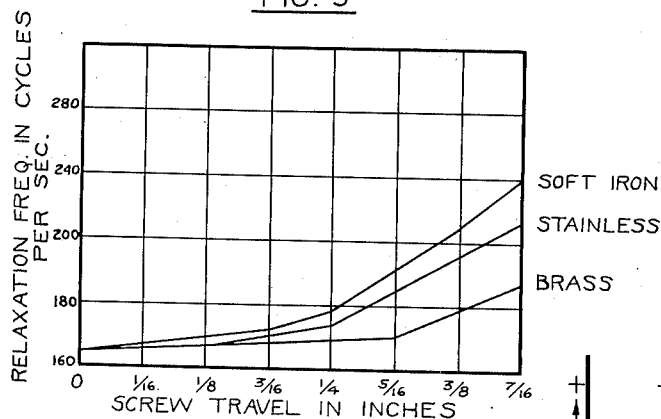
Figure 6 is a graphic illustration of the relationship between the adjustable screw position and the relaxation frequency.
Figure 7:
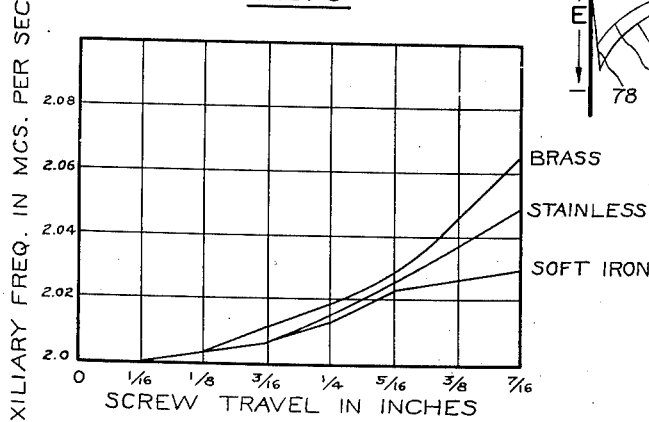
Figure 7 is a graphic illustration of the relationship between the position of the adjusting screw and the auxiliary frequency oscillation rate occurring in the relaxation oscillator.

This is clearly discernible in Figures 5, 6 and 7, which are graphs taken from a typical apparatus incorporating a 3A5 tube operating under conditions of 90 anode volts and 3 volts on the filament, connected in a relaxation oscillator circuit such as here shown with a repetition rate of 160-240 cycles per second and an auxiliary oscillation frequency of substantially 2 mcs. per second. In Figure 5 the decrease in grid current flow is separately shown for a brass, stainless steel, and soft iron screw, while Figure 6 illustrates the change simultaneously occurring in the relaxation frequency and Figure 7 the change occurring in the auxiliary oscillation frequency. While the standardization of grid current is particularly advantageous in connection with the humidity indications, it is also of value in preventing variable difference between the ambient temperature and the temperature of the temperature responsive resistor 66, with the consequent introduction of unpredictable errors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed and desired to be secured by United States Letters Patent is:

1. In humidity responsive apparatus, an electric discharge device having input and output electrodes, circuits coupling said input and output electrodes in positive feedback relationship whereby sustained oscillations are generated, an electrolytic humidity responsive resistor connected with said electric discharge device and traversed by direct current flowing to one of said electrodes, a first means for controlling the frequency of said oscillations whose operation is characterized by an increase in the current traversing said resistor with increase in the oscillation frequency, and a second means for controlling the frequency of said oscillations whose operation is characterized by a decrease in the current traversing said resistor with increase in the oscillation frequency.

2. In humidity responsive apparatus, an electric discharge device having input and output electrodes, circuits coupling said input and output electrode to produce sustained oscillations, an electrolytic humidity responsive resistor connected with said electric discharge device and traversed by direct current flowing to said input electrode, a first means for controlling the frequency of said oscillations whose operation is characterized by an increase in the current traversing said resistor with increase in the oscillation frequency, and a second means for controlling the frequency of said oscillations whose operation is characterized by a decrease in the current traversing said resistor with increase in the oscillation frequency.

3. In combination; an electric discharge device having at least a cathode, a control grid and an anode, circuits connecting said anode and said control grid in positive feedback relationship whereby sustained oscillations are generated, said circuits including an oscillation transformer, said transformer comprising a pair of concentric coils having the inner coil connected to said control grid and the outer coil connected to said anode, means for varying the energy losses in said oscillation transformer comprising a conducting member located co-axially with respect to said pair of concentric coils and movable in a direction along the axis thereof, a leak circuit including an electrolytic humidity responsive resistance connected between said control grid and said cathode, said humidity responsive resistance responding also to changes in the magnitude of current flow therethrough, and a grid capacitor connected in shunt with said leak circuit for relaxation frequencies, said leak circuit and said grid capacitor being so proportioned as to produce intermittent interruption at said relaxation frequency of said oscillations.

4. The combination defined by claim 3, wherein said coils are tightly coupled to maintain said oscillations at a substantially constant frequency irrespective of the position of said conducting member.

5. In combination, an electric discharge device having at least a cathode, a control grid and an anode, circuits connecting said anode and said control grid in positive feed-back relationship whereby sustained oscillations are generated, said circuits including an oscillation transformer having one winding connected to said anode and its other winding connected to said grid, said windings comprising coaxial coils, means for varying the energy losses in said oscillation transformer whereby the grid current flowing through said electric discharge device may be controlled, said last-named means comprising a conducting member located axially with respect to said coils and movable in a direction along the axis thereof, a leak circuit including an electrolytic humidity responsive resistor connected between said control grid and said cathode, said resistor responding also to changes in the magnitude of current flow therethrough, and a grid capacitor connected in shunt with said leak circuit for relaxation frequencies, said leak circuit and said grid capacitor being so proportioned as to produce intermittent interruption at said relaxation frequency of said oscillations.

JAMES R. COSBY.

REFERENCES CITED

The following references are of record in the file of this patent:

UNITED STATES PATENTS

| Number | Name | Date |
|---|---|---|
| 1,898,181 | Hansell | Feb. 21, 1933 |
| 2,140,004 | Falloon | Dec. 13, 1938 |
| 2,287,786 | Diamond et al. | June 30, 1942 |
| 2,295,570 | Dunmore | Sept. 15, 1942 |
| 2,304,095 | Hull | Dec. 8, 1942 |
| 2,304,633 | Farnsworth | Dec. 8, 1942 |
| 2,396,439 | Schlesinger | Mar. 12, 1946 |

FOREIGN PATENTS

| Number | Country | Date |
|---|---|---|
| 544,226 | Great Britain | Apr. 2, 1942 |